United States Patent
Dambrine et al.

(10) Patent No.: US 9,321,100 B2
(45) Date of Patent: Apr. 26, 2016

(54) METHOD FOR PRODUCING A METAL REINFORCEMENT FOR A TURBOMACHINE BLADE

(75) Inventors: Bruno Jacques Gérard Dambrine, Le Châtelet-en-Brie (FR); Thierry Godon, Sevran (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 303 days.

(21) Appl. No.: 13/877,985

(22) PCT Filed: Oct. 5, 2011

(86) PCT No.: PCT/FR2011/052324
§ 371 (c)(1),
(2), (4) Date: May 1, 2013

(87) PCT Pub. No.: WO2012/045980
PCT Pub. Date: Apr. 12, 2012

(65) Prior Publication Data
US 2013/0219717 A1    Aug. 29, 2013

(30) Foreign Application Priority Data

Oct. 5, 2010  (FR) ..................................... 10 58078

(51) Int. Cl.
*B21K 3/04* (2006.01)
*B21D 53/78* (2006.01)
(Continued)

(52) U.S. Cl.
CPC . *B21K 3/04* (2013.01); *B21D 53/78* (2013.01); *B23K 20/021* (2013.01); *B23P 15/04* (2013.01);
(Continued)

(58) Field of Classification Search
CPC ....... F10D 5/005; F01D 5/147; F04D 29/388; F04D 29/324; F04D 29/023; F05D 2300/702; F05D 2240/121; F05D 2240/303; B21K 3/04; B23P 15/04; B21D 53/78; B23K 20/021; B23K 2201/001; B29C 65/483; B29C 65/484; B29C 66/721; B29C 66/301; B29C 66/53; B29C 66/742; B29L 2031/082; Y10T 29/49336

See application file for complete search history.

(56) References Cited

U.S. PATENT DOCUMENTS 4,683,018 A * 7/1987 Sutcliffe et al. ............... 156/196
4,738,594 A   4/1988 Sato et al.
(Continued)

FOREIGN PATENT DOCUMENTS

EP    1 574 270    9/2005
EP    1 908 919    4/2008
(Continued)

OTHER PUBLICATIONS

International Search Report as issued for PCT/FR2011/052324.

*Primary Examiner* — David Bryant
*Assistant Examiner* — Lee A Holly
(74) *Attorney, Agent, or Firm* — Pillsbury Winthrop Shaw Pittman LLP

(57) ABSTRACT

A method for producing a metal reinforcement for the leading edge or trailing edge of a turbomachine blade, the method including cutting a plurality of metal foils from a flexible metal sheet, corresponding substantially to the developed length of the leading or trailing edge metal reinforcement; producing a plurality of metal pockets, each pocket being produced from two of the metal foils obtained during the cutting; stacking the metal pockets one inside the other, such as to form a preform of the leading or trailing edge metal reinforcement; and hot isostatic pressing the preform, causing the metal pockets to bond to one another, so as to produce the leading or trailing edge metal reinforcement.

10 Claims, 3 Drawing Sheets

(51) Int. Cl.
- *B23K 20/02* (2006.01)
- *B23P 15/04* (2006.01)
- *F01D 5/00* (2006.01)
- *F01D 5/14* (2006.01)
- *F04D 29/02* (2006.01)
- *F04D 29/32* (2006.01)
- *F04D 29/38* (2006.01)
- *B29C 65/00* (2006.01)
- *B29L 31/08* (2006.01)
- *B29C 65/48* (2006.01)

(52) U.S. Cl.
CPC ............... *F01D 5/005* (2013.01); *F01D 5/147* (2013.01); *F04D 29/023* (2013.01); *F04D 29/324* (2013.01); *F04D 29/388* (2013.01); *B23K 2201/001* (2013.01); *B29C 65/48* (2013.01); *B29C 65/483* (2013.01); *B29C 65/484* (2013.01); *B29C 66/12461* (2013.01); *B29C 66/12463* (2013.01); *B29C 66/301* (2013.01); *B29C 66/53* (2013.01); *B29C 66/721* (2013.01); *B29C 66/742* (2013.01); *B29L 2031/082* (2013.01); *F05D 2240/121* (2013.01); *F05D 2240/303* (2013.01); *F05D 2300/702* (2013.01); *Y02T 50/672* (2013.01); *Y02T 50/673* (2013.01); *Y10T 29/49336* (2015.01)

(56) References Cited

U.S. PATENT DOCUMENTS

| | | |
|---|---|---|
| 2006/0138200 A1 | 6/2006 | Oehring et al. |
| 2009/0044592 A1 | 2/2009 | Shikano et al. |
| 2011/0143162 A1* | 6/2011 | Merrill et al. ................ 428/603 |

FOREIGN PATENT DOCUMENTS

| | | |
|---|---|---|
| EP | 2 037 082 | 3/2009 |
| GB | 2 168 002 | 6/1986 |

* cited by examiner

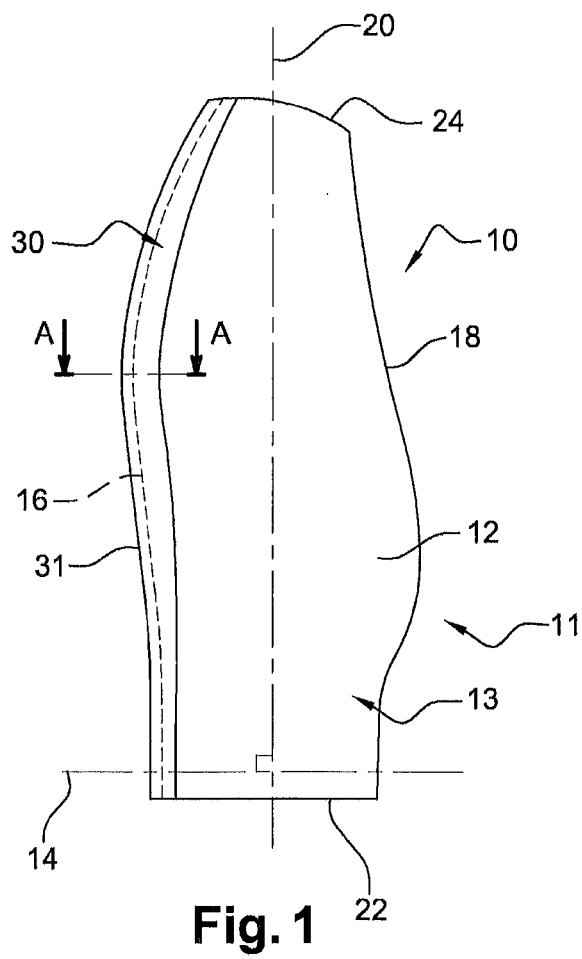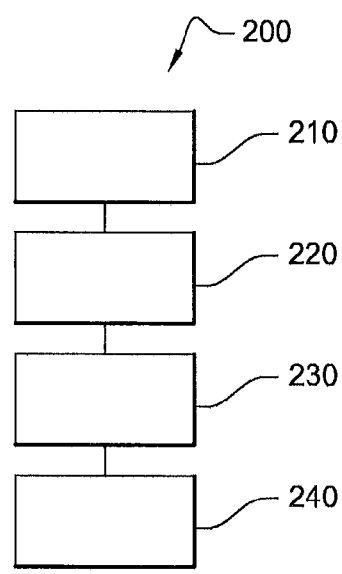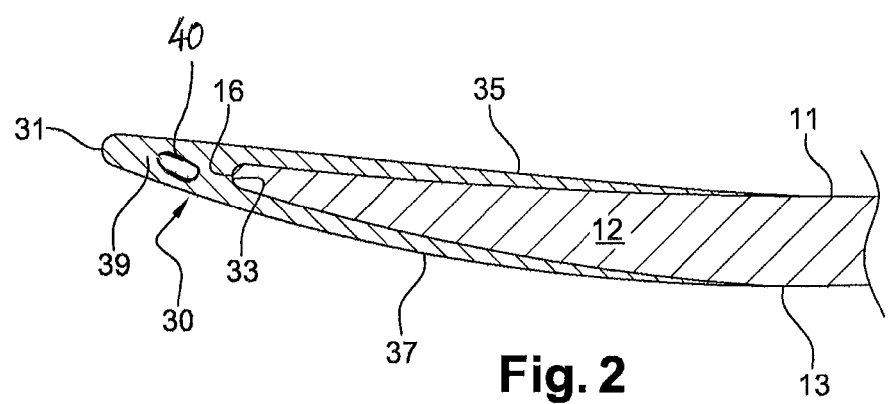

METHOD FOR PRODUCING A METAL REINFORCEMENT FOR A TURBOMACHINE BLADE

CROSS-REFERENCE TO RELATED APPLICATIONS

This is the U.S. National Stage of PCT/FR2011/052324, filed Oct. 5, 2011, which in turn claims priority to French Patent Application No. 1058078, filed Oct. 5, 2010, the entire contents of all applications are incorporated herein by reference in their entireties.

The present invention relates to a method for producing a metal reinforcement for a composite or metal turbomachine blade.

More particularly, the invention relates to a method for producing a metal reinforcement of the leading edge of a turbomachine blade.

The field of the invention is that of turbomachines and more particularly that of fan blades, made of composite or metal material, of a turbomachine and whereof the leading edge comprises a metal structural reinforcement.

However, the invention also applies to the production of a metal reinforcement intended to reinforce a blade leading edge or trailing edge of any kind of turbomachine, terrestrial or aeronautic, and in particular a helicopter turboengine or an aircraft turbojet engine, but also propellers such as non-shrouded twin-fan contra-rotating propellers ("open rotor").

It will be recalled that the leading edge corresponds to the front part of an aerodynamic profile which faces the air flow and which divides the air flow into a lower-surface air flow and an upper-surface air flow. The trailing edge corresponds to the rear part of an aerodynamic profile where the lower-surface and upper-surface flows are united.

The turbomachine blades, and in particular the fan blades, undergo considerable mechanical stresses, associated in particular with the rotational speed, and have to comply with strict conditions concerning weight and space requirement. Consequently, use is made of blades made of composite materials which are lighter.

It is known to provide the fan blades of a turbomachine, produced in composite materials, with a metal structural reinforcement extending over the whole height of the blades and beyond their leading edge, as mentioned in document EP 1908919. Such a reinforcement permits the composite blades to be protected during an impact of a foreign body on the fan, such as for example a bird, hail or stones.

In particular, the metal structural reinforcement protects the leading edge of the composite blade by preventing risks of delamination, fibre rupture or damage due to fibre/matrix de-cohesion.

Conventionally, a turbomachine blade comprises an aerodynamic surface extending, in a first direction, between a leading edge and a trailing edge and, in a second direction essentially perpendicular to the first direction, between a foot and a head of the blade. The metal structural reinforcement assumes the shape of the leading edge of the aerodynamic surface of the blade and extends in the first direction beyond the leading edge of the aerodynamic surface of the blade assuming the shape of the profile of the lower surface and the upper surface of the blade and in the second direction between the foot and the head of the blade.

In a known manner, the metal structural reinforcement is a metal part produced entirely by milling from a block of material.

However, the metal reinforcement of a leading edge of a blade is a part that is complex to produce, requiring numerous complex reworking and tooling operations involving high production costs.

In this context, the invention aims to solve the aforementioned problems by proposing a method of producing a metal reinforcement for the leading edge or trailing edge of a turbomachine blade permitting the production range of such a part to be simplified, whilst at the same time reducing production costs.

For this purpose, the invention proposes a method of producing a metal reinforcement for the leading edge or trailing edge of a turbomachine blade comprising successively:
- a step for cutting, in at least one flexible metal sheet, a plurality of metal foils corresponding essentially to the evolute of said leading edge or trailing edge metal reinforcement;
- a step for the production of a plurality of metal pockets, each metal pocket being produced from two metal foils cut during the preceding step;
- a step for stacking said metal pockets one inside the other, in such a way as to form a preform of said leading or trailing edge metal reinforcement;
- a step comprising the hot isostatic pressing of said preform, causing compaction of said metal pockets to one another, in such a way as to obtain said leading or trailing edge metal reinforcement.

The words "foil corresponding essentially to the evolute of said reinforcement" are understood to mean a foil, the general shape whereof approaches the shape of the evolute of the reinforcement, but the dimensions of said foil are not necessarily the final dimensions of the reinforcement.

Thanks to the invention, the metal structural reinforcement is produced in a straightforward and rapid manner from a stack of flexible metal pockets of small thickness forming the preform of the metal reinforcement and by a process comprising hot isostatic pressing or compacting (HIP—Hot Isostatic Pressing) permitting a part that is compact and without porosity to be obtained by the combination of plastic deformation, plastic flow and diffusion welding.

The metal pockets are produced by the cutting of foils, the geometry whereof corresponds to the evolute of the metal reinforcement, from at least one metal sheet or strip of small thickness, the foils being rigidly locked together so as to produce a pocket that is easy to slide or to assemble by insertion onto a shaping template or into a shaping tool.

This method of production thus makes it possible to avoid the complex production of the blade reinforcement by machining in solid material, of the milling or broaching type, from flat bars requiring a large volume of material to be used and consequently high costs on the supply of raw material. The method also makes it possible to produce in a straightforward manner metal reinforcements that comply with strict requirements on mass and/or geometry.

The method of producing a metal reinforcement for a turbomachine blade according to the invention can also comprise one or more of the following features, considered individually or in any technically possible combinations:
- said step for producing a plurality of metal pockets is carried out by superposition of two separate metal foils, then by joining at least one edge of said two metal foils by bonding means;
- said step for producing a plurality of metal pockets is carried out by bending a junction zone between two metal foils, then by joining at least one edge of said two metal foils by bonding means;

said bonding means of said step for producing a plurality of metal pockets are gluing means and/or welding means;
said welding means are spot welding means;
said step for cutting is carried out in at least one metal sheet with a thickness between 0.1 mm and 0.3 mm;
said step for stacking comprises a sub-step for incorporating an insert between two successive metal pockets;
said sub-step for incorporating an insert is a step for inserting a solid or woven metal insert or a temporary insert capable of being dissolved by chemical attack;
said step for stacking said metal pockets one inside the other is carried out by stacking said metal pockets by means of a shaping template;
said step for stacking said metal pockets one inside the other is carried out by stacking said metal pockets in a mould or on a counter-mould of a hot isostatic pressing tool.

Other features and advantages of the invention will emerge more clearly from the description thereof given below, by way of indication and on no account limiting, making reference to the appended figures, amongst which:

FIG. 1 is a side view of a blade comprising a hollow metal structural reinforcement of a leading edge obtained by means of the method of production according to the invention;

FIG. 2 is a partial cross-sectional view of FIG. 1 in a cross-sectional plane AA;

FIG. 3 is a block diagram showing the main steps for the production of a metal structural reinforcement of the leading edge of a turbomachine blade of the method of production according to the invention;

In all the figures, common elements have the same reference numbers unless stated to the contrary.

Figure 4:
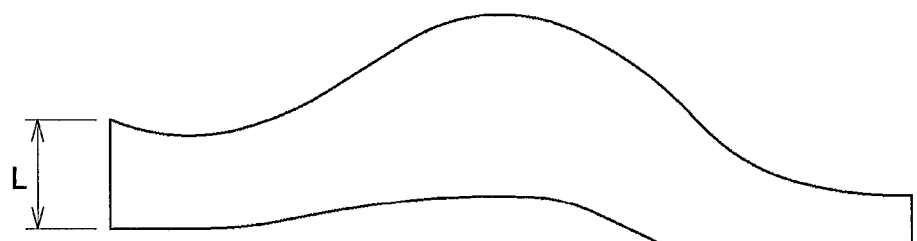
FIG. 4 illustrates a side view of the metal reinforcement of the leading edge of a turbomachine blade during the first step of the method of production illustrated in FIG. 3.

In the following description, the metal reinforcement of the leading edge or trailing edge will be referred without distinction as a metal reinforcement or a reinforcement.

FIG. 1 is a side view of a blade comprising a hollow metal structural reinforcement of a leading edge obtained by means of the method of production according to the invention.

Illustrated blade 10 is for example a mobile fan blade of a turbomachine (not represented).

Blade 10 comprises an aerodynamic surface 12 extending in a first axial direction 14 between a leading edge 16 and a trailing edge 18 and in a second radial direction 20 essentially perpendicular to first direction 14 between a foot 22 and a head 24.

Aerodynamic surface 12 forms an upper surface 13 and a lower surface 11 of blade 10, only upper surface 13 of blade 10 being represented in FIG. 1. Lower surface 11 and upper surface 13 form the lateral faces of blade 10 which connect leading edge 16 to trailing edge 18 of blade 10.

In this embodiment, blade 10 is a composite blade typically obtained by draping or shaping a woven fibrous texture. By way of example, the composite material used can comprise an assembly of woven carbon fibres and a resin matrix, the assembly being formed by moulding by means of a resin injection process of the RTM type (standing for "Resin Transfer Moulding").

Blade 10 comprises a metal structural reinforcement 30 glued at its leading edge 16 and which extends both in first direction 14 beyond leading edge 16 of aerodynamic surface 12 of blade 10 and in second direction 20 between foot 22 and head 24 of the blade.

As represented in FIG. 2, structural reinforcement 30 assumes the shape of leading edge 16 of aerodynamic surface 12 of blade 10 which it extends to form a leading edge 31, the so-called leading edge of the reinforcement.

Conventionally, structural reinforcement 30 is a monobloc part having an essentially V-shaped section comprising a base 39 forming leading edge 31 and extended by two lateral sides 35 and 37 respectively assuming the shape of lower surface 11 and upper surface 13 of aerodynamic surface 12 of the blade. Sides 35, 37 have a profile that tapers or thins out in the direction of the trailing edge of the blade.

Base 39 of structural reinforcement 30 also comprises an internal cavity 40 extending over the height of structural reinforcement 30, from the foot to the head of the blade.

Structural reinforcement 30 is metallic and preferably titanium-based. This material in fact has a great capacity for energy absorption due to impacts. The reinforcement is glued on blade 10 by means of glue known to the person skilled in the art, such as for example a cyanoacrylic glue or epoxy glue.

This type of metal structural reinforcement 30 used for the reinforcement of a composite turbomachine blade is more particularly described in patent application EP 1908919.

The method according to the invention makes it possible to produce a structural reinforcement such as illustrated in FIG. 2, FIG. 2 illustrating reinforcement 30 in its final state.

FIG. 3 represents a block diagram illustrating the main steps of a method of production 200 of a metal structural reinforcement 30 of the leading edge of a blade 10 as illustrated in FIGS. 1 and 2.

First step 210 of method of production 200 is a step for cutting a plurality of flexible metal pieces 101, 101', 102, 102', referred to below as metal foils, from a flexible metal sheet or metal strip of small thickness based on titanium. Two examples of cutting the foils are illustrated in FIGS. 4 and 5.

Figure 5:
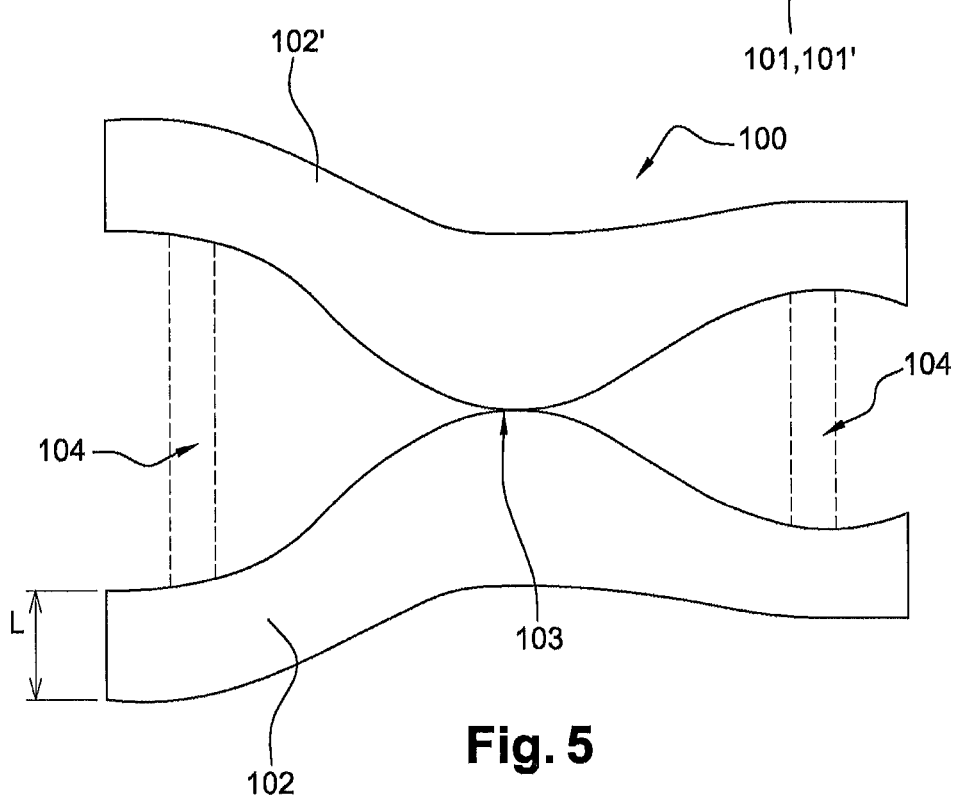
FIG. 5 illustrates a side view of a second example of a metal reinforcement of the leading edge of a turbomachine blade during the first step of the method illustrated in FIG. 3.

Metal foils 101, 101', 102, 102', as illustrated in FIGS. 4 and 5, are cut by conventional means for cutting metal sheets of small thickness, i.e. a thickness less than 0.3 mm. Thus, metal foils 101, 101', 102, 102' can be cut for example by die-cutting means, means of cutting by shearing or by water jet, etc.

Cut metal foils 101, 101', 102, 102' have a geometry corresponding essentially to the evolute of metal reinforcement 30 of the leading edge of blade 10, as illustrated in FIGS. 1 and 2. Thus, metal foils 101, 101' and 102, 102' have a geometry corresponding essentially to the evolute of the lower surface and upper surface of metal reinforcement 30.

Figure 6:
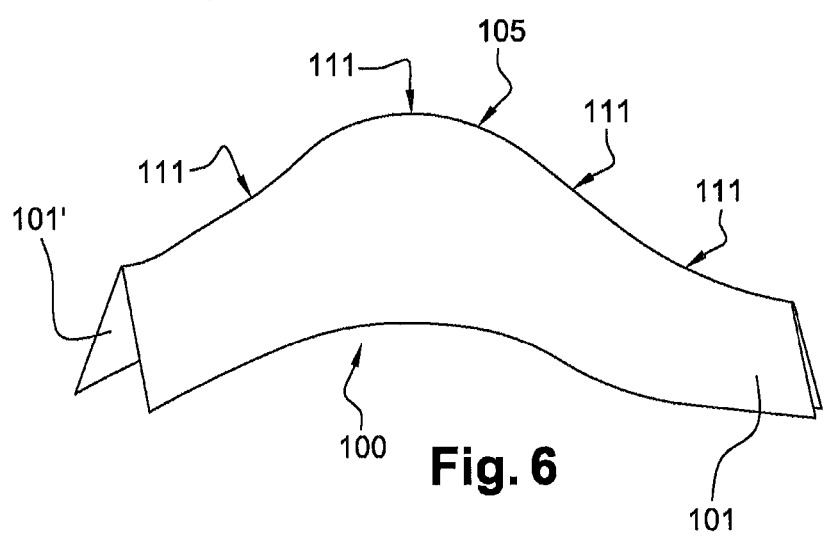
FIG. 6 illustrates a perspective view of the metal reinforcement of the leading edge of a turbomachine blade during the second step of the method illustrated in FIG. 3.

Second step 220 of method of production 200 is a step for producing metal pockets 100, as illustrated in FIG. 6, from flexible metal foils 101, 101', 102, 102'.

According to the first example of cutting metal foils 101, 101' illustrated in FIG. 4, pockets 100 are produced by superposing a first foil 101 corresponding to the geometry of the lower surface of metal reinforcement 30 with a second foil 101' corresponding to the geometry of the upper surface of metal reinforcement 30. The two foils 101, 101' are then joined at least at a common edge 105 corresponding essentially to the profile of leading edge 31 of reinforcement 30, for example by gluing or by welding means so as to form a metal pocket 100.

The gluing of two metal foils 101, 101' made of titanium can be carried out simply by heating two superposed metal foils 101, 101' under a slightly pressurised atmosphere.

The welding at edge 105 is carried out by known welding means permitting two metal sheets made of titanium of small thickness to be welded. Thus, by way of example, two foils 101, 101' are joined by spot welds 111 by an electrical spot welding method.

According to the second example of cutting metal foils 102, 102' illustrated in FIG. 5, the two foils 102, 102' forming the lower surface and the upper surface of metal reinforcement 30 are held rigidly connected to each other at a junction zone 103 and also, if need be, by two holding tabs 104 on each side of junction zone 103, thus ensuring stability of the metal foils after cutting step 210 during various handling operations.

The production of pocket 100 is carried out by bending the two foils 102, 102' at junction zone 103 in such a way as to superpose the two foils 102, 102' one upon the other. During the bending operation, the two holding tabs 104 are removed, for example by cutting means.

Similar to the first example described previously, pocket 100 is produced by forming a bond, by means of a gluing method or a welding method, at least at edges 105 of the two foils 102, 102' defining the profile of the leading edge of the reinforcement.

Third step 230 is a step for producing a preform 110 of metal reinforcement 30 by the successive stacking of a plurality of pockets 100 one inside the other.

According to a first example of embodiment, the sacking of the different pockets 100 is carried out on a shaping template (not represented) so as to form preform 110 of metal reinforcement 30.

Figure 7:
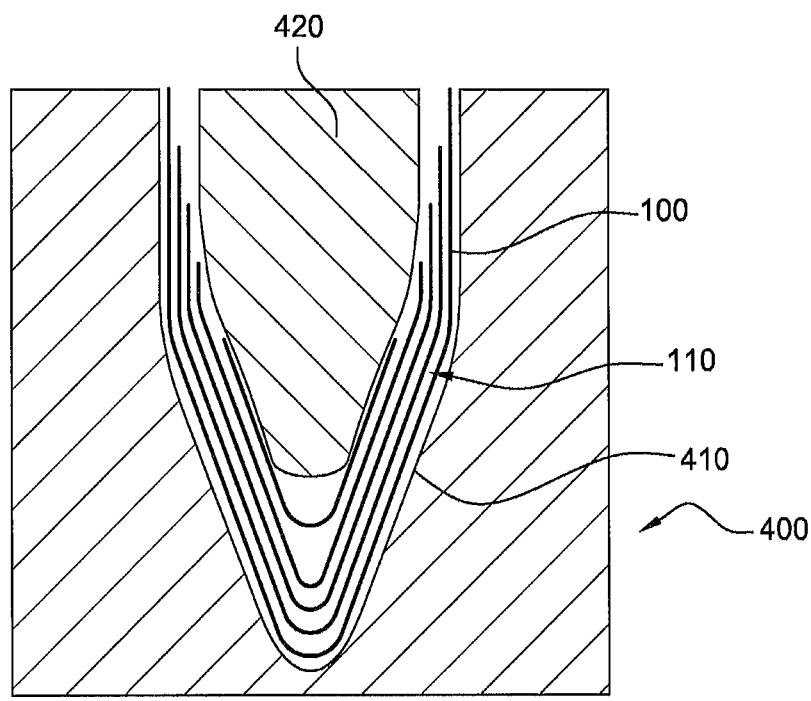
FIG. 7 illustrates a cross-sectional view of the metal reinforcement of the leading edge of a turbomachine blade during the third step of the method illustrated in FIG. 3.

According to this first example of embodiment, an additional operation of putting the preform in place in a shaping tool 400, illustrated diagrammatically in FIG. 7, is required. Tool 400 comprises a mould (bottom die) 410 corresponding to the final external shape of metal reinforcement 30 and a counter-mould (punching die) 420 corresponding to the final internal shape of the leading edge metal reinforcement.

According to a second example of embodiment, the stacking of the different pockets 100 is carried out directly in mould 410 or on counter-mould 420.

Pockets 100 are advantageously produced from foils having different widths L, in such a way that preform 110, formed by the stacking of different pockets, complies with the material thickness requirements necessary for producing the final part (i.e. metal reinforcement 30).

It is also envisaged to optimise the thicknesses of the preform by carrying out stacking with flexible metal pockets of differing thickness, i.e. with thicknesses varying essentially between 0.05 and 0.3 mm.

Pockets 100 of differing size also make it possible to produce in a straightforward manner a stack that can easily be transported, in particular by successive stacking in order of decreasing size of pockets 100, as illustrated in FIG. 7. Thus, the pocket having the largest size forms the external surface of preform 110 in contact with mould 410 and the pocket having the smallest size forms the internal surface of preform 110 in contact with counter-mould 420. Thus, the different pockets 100 of the preform are enclosed and held by the external pocket having the largest size.

However, a stack different from the one presented previously is also envisaged.

According to another example of embodiment, an insert can be inserted between two successive pockets 100 in such a way as to provide, for example, an extra thickness of more important material, a specific reinforcement produced in a different material, or to produce a hollow metal reinforcement.

By way of example, the insert can be a solid insert produced by a forging or machining method, or by casting, or again an insert woven by means of metal wires, for example with titanium wires and/or wires based on sodium carbide and titanium (SiC—Ti), and/or wires coated with boron (SiC-boron), or with silicon carbide (SiC—SiC).

Whatever the nature of the material used to produce the insert inserted between the coils, it is necessary for this material to be compatible with the nature of the material used to produce the metal coils and to possess properties permitting superplastic shaping or diffusion welding.

In order to produce a hollow metal reinforcement (not represented), the insert is a temporary insert produced in a material different from the material of metal foils 100.

"Temporary insert" is understood to mean an insert which is not intended to be permanent and which is only required for the production of the hollow metal reinforcement of the leading edge. The temporary insert is not therefore present in the metal reinforcement in its final state and under no circumstances participates in the mechanical characteristics of the metal reinforcement.

The temporary insert is produced for example in a material capable of withstanding a high temperature, of the order of 900° C., a high pressure, of the order of 1000 bar, and which is compatible with the materials of metal foils 100 so as not to create impurities or oxidation in preform 110.

The material of the temporary insert must also be able to be attacked chemically by dissolution by means of a chemical agent.

The temporary insert is advantageously produced in copper, or quartz or silica.

The shape of the temporary insert incorporated in the stack of metal foils 100 depends on the shape of the desired final internal cavity.

Figure 8:
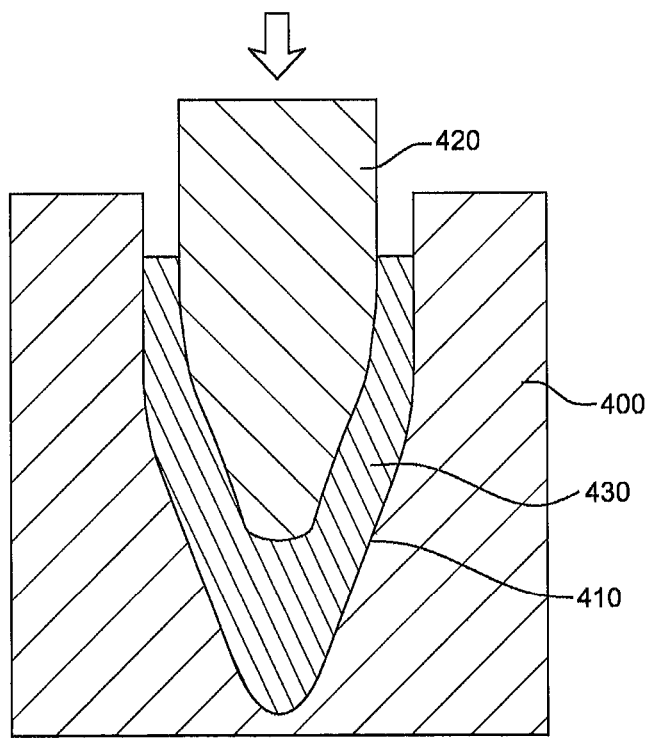
FIG. 8 illustrates a cross-sectional view of the metal reinforcement of the leading edge of a turbomachine blade during the fourth step of the method illustrated in FIG. 3.

Fourth step 240 of method of production 200 is a step comprising hot isostatic pressing (HIP) of the preform in tool 400, illustrated in FIG. 8.

Hot isostatic pressing is a very widely used and known production process for reducing the porosity of metals and influencing the density of numerous metals, such as ceramics. The isostatic pressing process makes it possible to improve, amongst other things, the mechanical properties and usability of materials.

The isostatic pressing is carried out at high temperature (conventionally between 400° C. and 1400° C., and of the order of 1000° C. for titanium) and at isostatic pressure.

Thus, the application of heat combined with the internal pressure eliminates the hollow spaces in the preform, as well as the microporosities, by means of a combination of plastic deformation, plastic flow and diffusion welding in such a way as to form a solid part 430.

Solid part 430 resulting from the isostatic pressing step comprises the internal and external profiles of metal reinforcement 30. Solid part 430 is then removed from tool 400.

The isostatic pressing step is carried out under vacuum, advantageously under secondary vacuum, either in a welded tool in which the secondary vacuum is produced, or in an autoclave bag, the choice of the process depending on the number of parts to be produced. The secondary vacuum makes it possible to avoid the presence of oxygen in the tool and in the fibrous structure during the step of isostatic pressing of the titanium.

Tool 400 is produced in a mechanical alloy, a so-called super-alloy or high-performance alloy.

Isostatic pressing step 240 can include in advance a step 235 for cleaning, degreasing and/or chemical attack of the different metal pockets 100 so as to eliminate residual impurities from the preform.

The step for cleaning out impurities is advantageously carried out by immersion of the fibrous assembly in a bath of cleaning agent or chemical agent.

In the context of producing a hollow metal reinforcement, the method according to the invention can comprise an additional step for chemical attack of the insert introduced during the step of stacking the different pockets into one another and forming an integral part of solid part 430. The chemical attack is carried out by means of a chemical agent capable of attacking the material in which the insert is produced. The chemical attack of the temporary insert permits the temporary insert to be dissolved in such a way that the space freed by the dissolved insert forms the internal cavity in the metal reinforcement. The chemical attack step is advantageously carried out by immersion of solid part 430 in a bath containing the chemical agent capable of dissolving the insert. The chemical agent is for example an acid or a base.

The chemical agent is advantageously capable of dissolving copper, quartz or silica.

In association with these main production steps, the method according to the invention can also comprise a step for finishing and reworking by machining the hollow solid part obtained when it leaves the tool, in such a way as to obtain reinforcement 30. This reworking step comprises:

a step for reworking the profile of base 39 of reinforcement 30 in order to refine the same and in particular the aerodynamic profile of leading edge 31;

a step for reworking sides 35, 37, this step consisting in particular in trimming sides 35, 37 and in thinning out the lower-surface and upper-surface sides;

a finishing step permitting the required surface state to be obtained.

In association with these main production steps, the method according to the invention can also comprise steps for non-destructive control of reinforcement 30 permitting the geometrical and metallurgical compliance of the obtained assembly to be ensured. By way of example, non-destructive controls can be carried out by an x-ray process.

The invention has been described in particular for the production of a metal reinforcement of a composite blade of a turbomachine; however, the invention is also applicable for the production of a metal reinforcement of a metal blade of a turbomachine.

The invention has been described in particular for the production of a metal reinforcement of the leading edge of a turbomachine blade; however, the invention is also applicable to the production of a metal reinforcement of the trailing edge of a turbomachine blade or to the production of a metal reinforcement of a composite or metal propeller.

The other advantages of the invention are in particular the following:
reduction of production costs;
reduction of production time;
simplification of the production range;
reduction of material costs.

The invention claimed is:

1. A method of production of a metal reinforcement of a leading edge or a trailing edge of a turbomachine blade comprising:
    cutting, in at least one flexible metal sheet, a plurality of metal foils corresponding to the evolute of said leading edge or trailing edge metal reinforcement;
    producing a plurality of metal pockets, each metal pocket being produced by attaching two metal foils together cut during the cutting;
    stacking said metal pockets one inside the other, in such a way as to form a preform of said leading or trailing edge metal reinforcement, and
    after said stacking, hot isostatic pressing said preform, causing said metal pockets to bond to one another, in such a way as to obtain said leading or trailing edge metal reinforcement.

2. The method of production of a metal reinforcement of the leading edge or trailing edge of a turbomachine blade according to claim 1, wherein said producing is carried out by superposition of two separate metal foils, and by joining at least one edge of said two metal foils by bonding.

3. The method of production of a metal reinforcement of the leading edge or trailing edge of a turbomachine blade according to claim 1, wherein said producing is carried out by bending a junction zone between two metal foils, and by joining at least one edge of said two metal foils by bonding.

4. The method of production of a metal reinforcement of the leading edge or trailing edge of a turbomachine blade according to claim 2, wherein said bonding is performed by gluing and/or welding.

5. The method of production of a metal reinforcement of the leading edge or trailing edge of a turbomachine blade according to claim 4, wherein said welding is performed by spot welding.

6. The method of production of a metal reinforcement of the leading edge or trailing edge of a turbomachine blade according to claim 1, wherein said cutting is carried out in at least one metal sheet having a thickness between 0.05 mm and 0.3 mm.

7. The method of production of a metal reinforcement of the leading edge or trailing edge of a turbomachine blade according to claim 1, wherein said stacking comprises incorporating an insert between two successive metal pockets.

8. The method of production of a metal reinforcement of the leading edge or trailing edge of a turbomachine blade according to claim 7, wherein said incorporating includes inserting a solid or woven metal insert or a temporary insert capable of being dissolved by chemical attack.

9. The method of production of a metal reinforcement of the leading edge or trailing edge of a turbomachine blade according to claim 1, wherein said stacking is carried out by stacking said metal pockets using a shaping template.

10. The method of production of a metal reinforcement of the leading edge or trailing edge of a turbomachine blade according to claim 1, wherein said stacking is carried out by stacking said metal pockets in a mould or on a counter-mould of a hot isostatic pressing tool.

\* \* \* \* \*